(12) United States Patent
Wang et al.

(10) Patent No.: US 11,022,506 B2
(45) Date of Patent: Jun. 1, 2021

(54) FORCE SENSOR WITH STRAIN GAUGE ATTACHED TO FLEXIBLE WALL OF A MAIN BEAM OF THE FORCE SENSOR

(71) Applicants: Mettler-Toledo (Changzhou) Precision Instrument Ltd., Changzhou (CN); Mettler-Toledo (Changzhou) Measurement Technology Ltd., Changzhou (CN); Mettler-Toledo International Trading (Shanghai) Co., Ltd., Shanghai (CN)

(72) Inventors: Jianwen Wang, Changzhou (CN); Yujun Xu, Changzhou (CN); Wei Wang, Changzhou (CN)

(73) Assignees: Mettler-Toledo (Changzhou) Precision Instrument Ltd., Changzhou (CN); Mettler-Toledo (Changzhou) Measurement Technology Ltd., Changzhou (CN); Mettler-Toledo International Trading (Shanghai) Co., Ltd., Shanghai (CN)

( * ) Notice: Subject to any disclaimer, the term of this patent is extended or adjusted under 35 U.S.C. 154(b) by 105 days.

(21) Appl. No.: 16/463,892

(22) PCT Filed: Nov. 28, 2017

(86) PCT No.: PCT/CN2017/113286
§ 371 (c)(1),
(2) Date: Jul. 3, 2019

(87) PCT Pub. No.: WO2018/095435
PCT Pub. Date: May 31, 2018

(65) Prior Publication Data
US 2020/0141823 A1 May 7, 2020

(30) Foreign Application Priority Data

Nov. 28, 2016 (CN) .......................... 201611070246.1

(51) Int. Cl.
*G01L 1/22* (2006.01)
*G01G 21/24* (2006.01)
*G01G 3/14* (2006.01)

(52) U.S. Cl.
CPC .......... *G01L 1/2243* (2013.01); *G01G 3/1412* (2013.01); *G01G 21/244* (2013.01)

(58) Field of Classification Search
CPC ... G01L 1/2243; G01G 21/244; G01G 3/1412
See application file for complete search history.

(56) References Cited

U.S. PATENT DOCUMENTS

| 4,065,962 A | * | 1/1978 | Shoberg | ............... G01G 3/1404 |
| | | | | 177/229 |
| 4,143,727 A | * | 3/1979 | Jacobson | ............. G01G 3/1404 |
| | | | | 177/211 |

(Continued)

FOREIGN PATENT DOCUMENTS

| CN | 102269634 A | 12/2011 |
| CN | 202119572 U | 1/2012 |
| CN | 206291984 U | 6/2017 |

*Primary Examiner* — Natalie Huls
(74) *Attorney, Agent, or Firm* — Standley Law Group LLP; Jeffrey S. Standley; Stephen L. Grant (57) ABSTRACT

A force sensor has a first end portion (1), a second end portion (2), a parallel-guiding mechanism (3), a beam (4), and a strain gauge (5). The parallel-guiding mechanism (3) connects the first end portion (1) to the second end portion (2). A main beam (43) of the beam has a flexible wall (435) and a rigid wall (432). A first connecting part (41) connects the flexible wall to the first end portion, and a second connecting part (42) connects the rigid wall to the second end portion. The strain gauge (5) is fixed to the flexible wall (435). The force sensor can measure a relatively small force.

11 Claims, 8 Drawing Sheets

(56) References Cited

U.S. PATENT DOCUMENTS

| | | | | |
|---|---|---|---|---|
| 4,181,011 A * | 1/1980 | Brendel | | G01G 3/1404 73/862.633 |
| 4,488,611 A * | 12/1984 | Jacobson | | G01G 3/1412 177/211 |
| 4,838,369 A * | 6/1989 | Albert | | G01G 3/13 177/210 FP |
| 5,220,971 A * | 6/1993 | Farr | | G01G 3/1412 177/211 |
| 5,313,023 A * | 5/1994 | Johnson | | G01P 15/097 177/229 |
| 5,391,844 A * | 2/1995 | Johnson | | G01G 3/1412 177/210 FP |
| 5,481,072 A * | 1/1996 | Ford | | G01G 3/16 177/210 FP |
| 5,604,336 A * | 2/1997 | Johnson | | G01G 3/1412 177/229 |
| 5,771,986 A * | 7/1998 | Kohn et al. | | G01G 21/244 177/210 EM |
| 6,633,008 B2 * | 10/2003 | Johnson | | G01G 3/13 177/184 |
| 6,755,087 B2 * | 6/2004 | Clegg | | G01G 23/005 73/862.621 |
| 8,829,367 B2 | 9/2014 | Kuhlmann et al. | | |
| 9,709,436 B2 * | 7/2017 | Johnson | | G01G 3/1412 |
| 9,726,559 B2 * | 8/2017 | Bodmer | | G01L 1/26 |
| 9,915,558 B2 * | 3/2018 | Gottfriedsen et al. | | G01G 7/02 |
| 2003/0111277 A1 * | 6/2003 | Aumard | | G01L 1/2243 177/229 |
| 2007/0125185 A1 * | 7/2007 | Hauck | | G01G 7/02 73/862.621 |
| 2011/0120235 A1 | 5/2011 | Shin et al. | | |

* cited by examiner

FORCE SENSOR WITH STRAIN GAUGE ATTACHED TO FLEXIBLE WALL OF A MAIN BEAM OF THE FORCE SENSOR

TECHNICAL FIELD

The present invention relates to a force sensor and, in particular, to a strain gauge-type force sensor.

BACKGROUND ART

U.S. Pat. No. 4,488,611 discloses a force sensor, comprising a first end portion, a second end portion and a beam for connecting the first end portion and the second end portion together. The beam comprises a main beam, a first connecting part for connecting the main beam and the first end portion together, and a second connecting part for connecting the main beam and the second end portion together. The main beam is provided with a cylindrical cavity and with uniformly distributed flexible walls. The force sensor further comprises strain gauges attached to the flexible walls and arranged in the cavity. Since the flexible walls are uniformly distributed, which results in non-concentrated stress, it is difficult to measure small forces accurately.

SUMMARY OF INVENTION

An object of the present invention is to provide a force sensor capable of measuring relatively small forces accurately.

According to one aspect of the present invention, a force sensor is provided with a first end portion, a second end portion, a parallel-guiding mechanism, a beam, and a strain gauge. The parallel-guiding mechanism is used for connecting the first end portion to the second end portion. The beam comprises a main beam, a first connecting part for connecting the main beam to the first end portion, and a second connecting part for connecting the main beam to the second end portion. The main beam comprises a flexible wall connected to the first connecting part, and a rigid wall connected to the second connecting part. The strain gauge is fixed to the flexible wall.

Preferably, a cavity is provided in the main beam. The strain gauge is arranged in the cavity, and the force sensor further comprises a cover plate for sealing the cavity in a welded manner.

Preferably, a protrusion connected to the first connecting part is provided on the outer side of the flexible wall, and two grooves are provided in a position where the protrusion intersects with the first connecting part.

Preferably, the flexible wall is formed by recessing the main beam outwardly.

Preferably, the strain gauge is arranged above and/or below the position where the first connecting part intersects with the flexible wall.

Preferably, the first connecting part is a rigid beam, and the second connecting part is a flexible beam.

Preferably, the second connecting part comprises a horizontal extension, and a flexible connecting part. The flexible connecting section of the second connecting part is located on the horizontal extension of the second connecting part.

Preferably, the second connecting part comprises a horizontal extension and a vertical extension, and the flexible connecting section of the second connecting part is located on the vertical extension of the second connecting part.

Preferably, the first end portion is a fixed portion, and the second end portion is a load-receiving portion.

Preferably, the strain gauges are arranged in a region close to the position where the first connecting part intersects the flexible wall.

By fixing the strain gauges in the region close to the position where the flexible wall intersects the first connecting part, the force sensor provided by the present invention can finely measure the change in the stress when the force sensor is stressed upon receiving a load, and can measure a relatively small force.

BRIEF DESCRIPTION OF DRAWINGS

The accompanying drawings, which are included to provide a further understanding of the present invention and are incorporated in and constitute a part of the present application, illustrate embodiments of the present invention and, together with the description, serve to explain the principle of the present invention. In the accompanying drawings.

DESCRIPTION OF EMBODIMENTS

Figure 1:
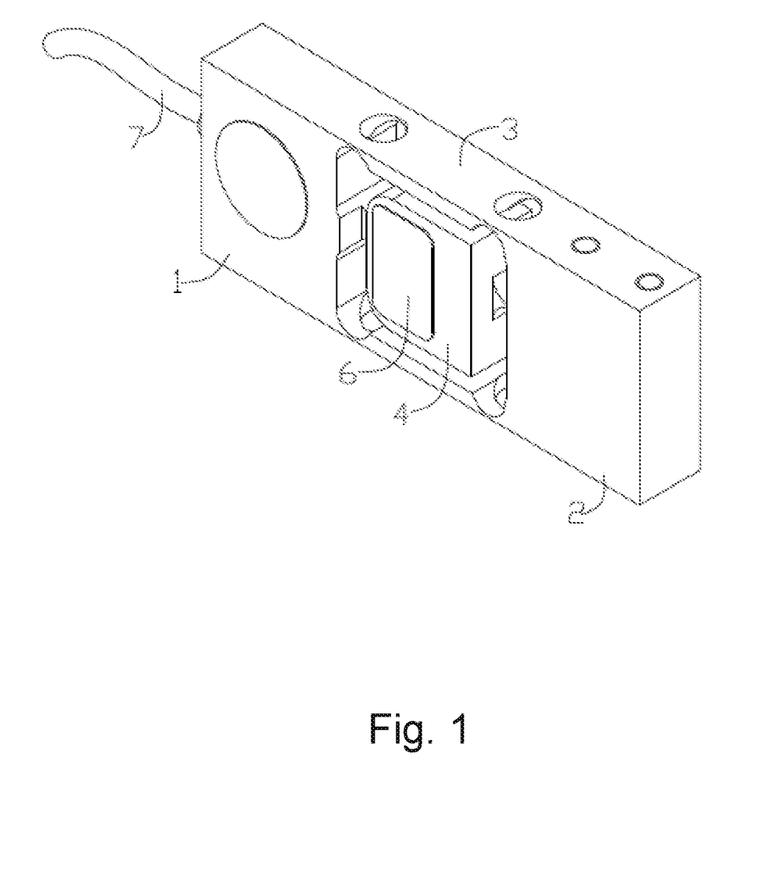
FIG. 1 is a perspective view of a force sensor of the present invention.
Figure 2:
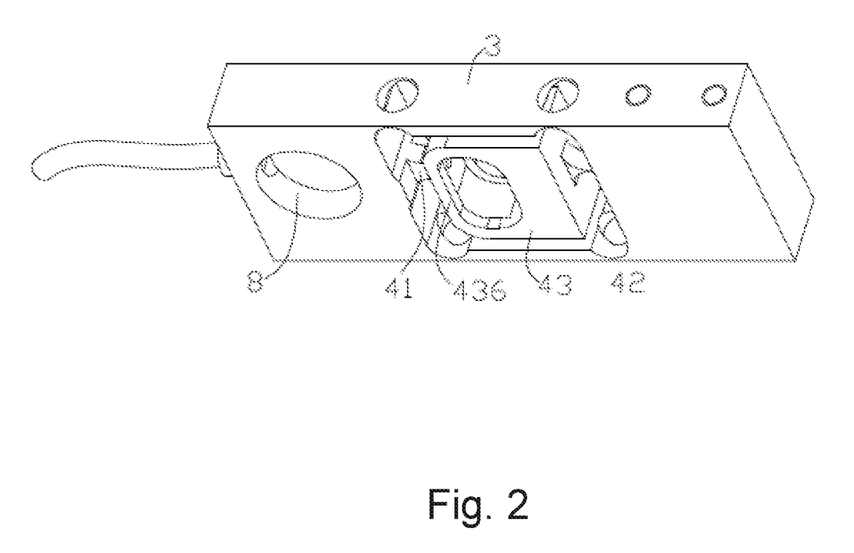
FIG. 2 is a perspective view of the force sensor of the present invention, with a cover plate being removed.
Figure 3:
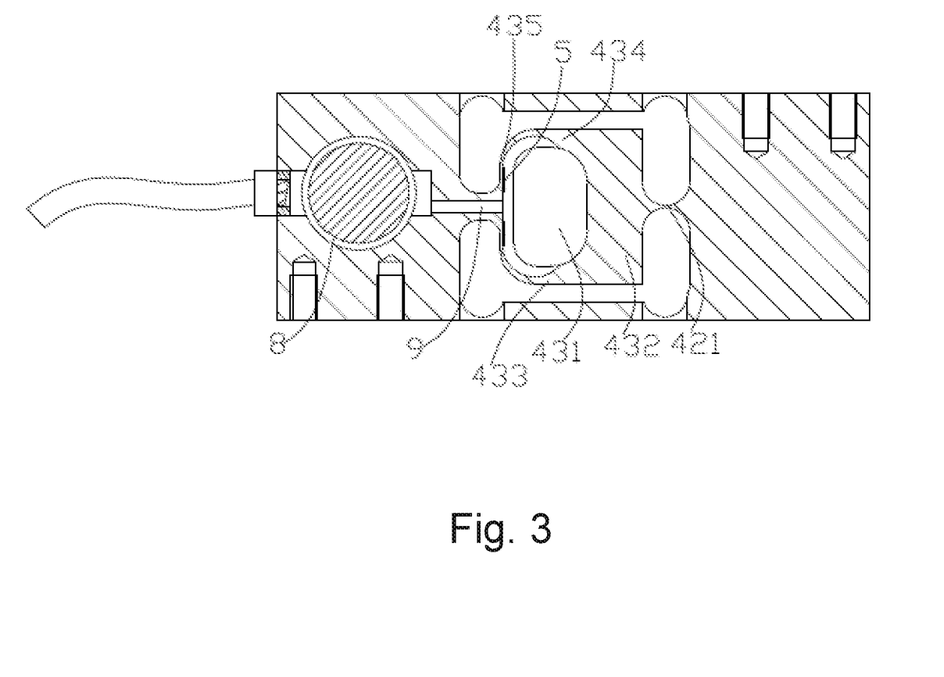
FIG. 3 is a cross-sectional view of the force sensor of the present invention.
Figure 4:
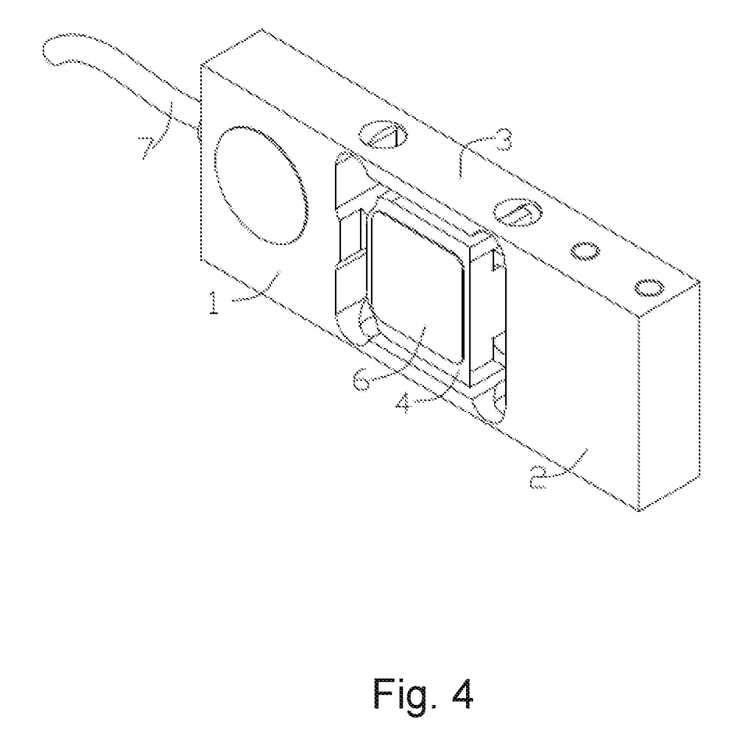
FIG. 4 is a perspective view of another embodiment of a force sensor of the present invention.
Figure 5:
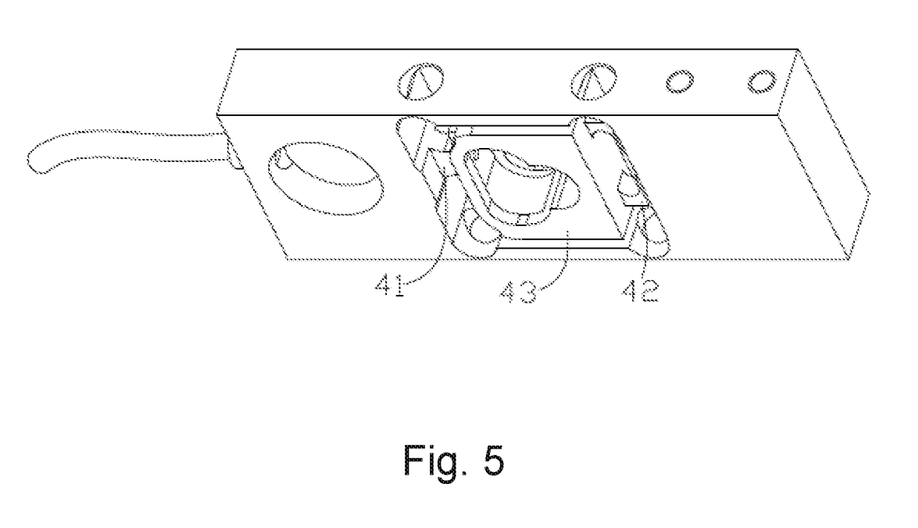
FIG. 5 is a perspective view of the force sensor in FIG. 4, with a cover plate being removed.
Figure 6:
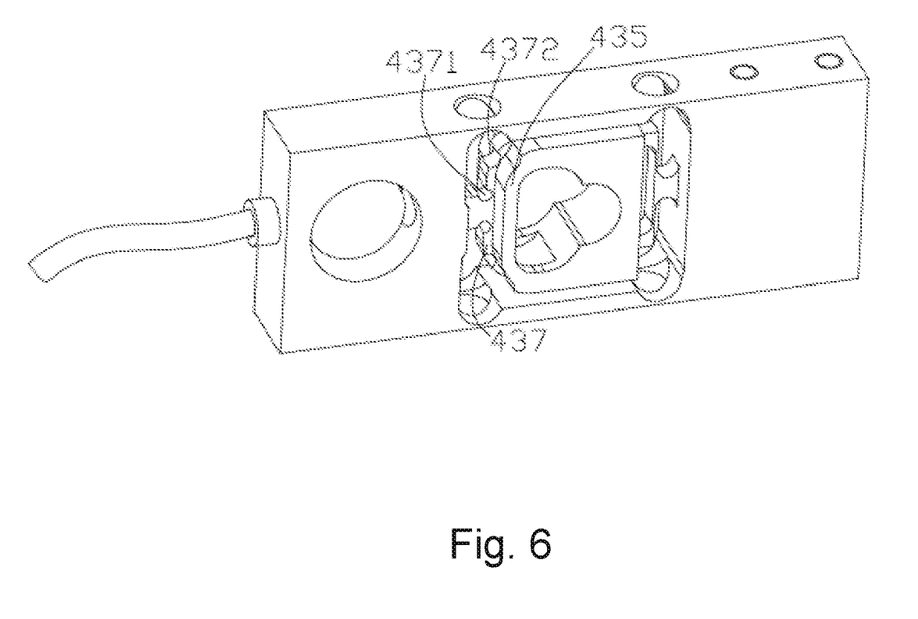
FIG. 6 is a perspective view of the force sensor in FIG. 5 from another angle.
Figure 7:
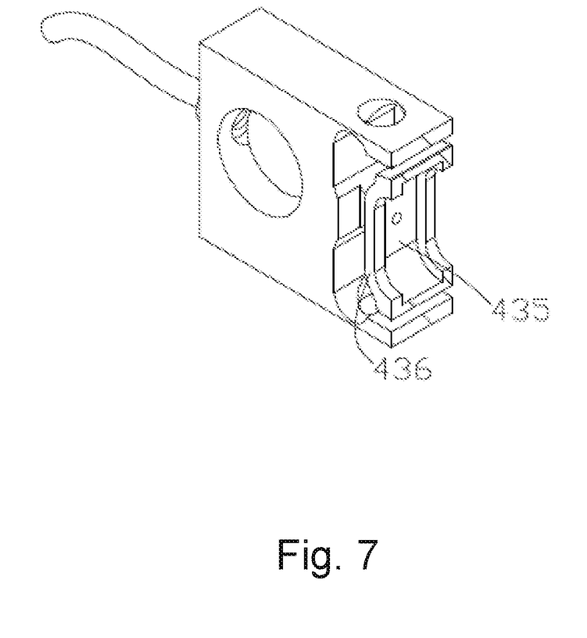
FIG. 7 is a sectional view of the force sensor in FIG. 5.
Figure 8:
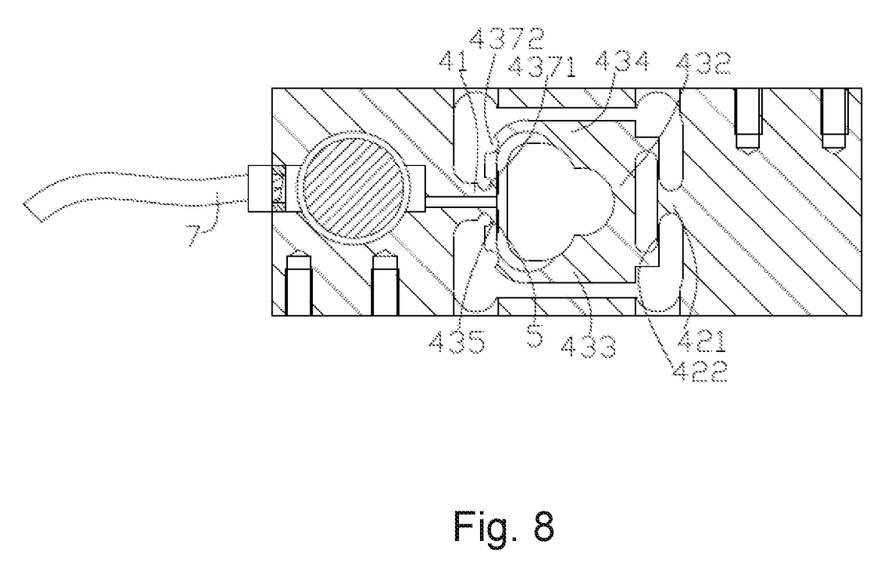
FIG. 8 is a cross-sectional view of the force sensor in FIG. 5.

Referring to FIGS. 1 to 3, a force sensor is shown, comprising a first end portion 1, a second end portion 2, and a parallel-guiding mechanism 3 for connecting the first end portion 1 and the second end portion 2 together. The force sensor further comprises a beam 4 and strain gauges 5. The beam 4 comprises a main beam 43, a first connecting part 41 for connecting the main beam 43 to the first end portion 1, and a second connecting part 42 for connecting the main beam 43 to the second end portion 2. The main beam 43 comprises a flexible wall 435 connected to the first connecting part 41, and a rigid wall 432 connected to the second connecting part 42. The strain gauges 5 are fixed to the flexible wall 435.

In a preferred implementation, the strain gauges 5 are arranged in a region close to the position where the flexible wall 435 intersects with the first connecting part 41. Since the stress in a region of the flexible wall 435 that is close to the first connecting part 41 is relatively concentrated, the design can be used to measure a relatively small weight in applications. In a preferred implementation, the strain gauges 5 are attached to a region adjacent to the position where the first connecting part 41 intersects the flexible wall 435.

A cavity 431 is provided in the main beam 43, and the strain gauges 5 are arranged in the cavity 431. The force sensor further comprises a cover plate 6 for sealing the cavity 431. With the arrangement, the strain gauges 5 are isolated from the outside, and the strain gauges 5 can be prevented from being affected by external humidity and"

moisture. In order to facilitate installation, the mounting surface of the flexible wall 435 is configured as a planar surface. The mounting surface is set as a vertical surface. In another implementation, the mounting surface of the flexible wall 435 can also be set as a curved surface.

For the purpose of this description, the accompanying drawings will be defined with reference to four directions, namely upper, lower, left and right directions. In this embodiment, the main beam 43 comprises an upper wall 434, a lower wall 433, a left wall 435, and a right wall 432. The cavity 431 is arranged between the upper wall 434, the lower wall 433, the left wall 435 and the right wall 432. The left wall 435 is set to be a flexible wall. This flexible wall 435 is connected to the first connecting part 41. The strain gauges 5 are attached to the flexible wall 435. The strain gauges 5 may be located only above or below the position where the first connecting part 41 intersects the flexible wall 435, or may be arranged above and below the position where the first connecting part 41 intersects the flexible wall 435.

An edge 436 extending inwardly from the flexible wall (i.e. in the direction of the cavity 431) is further provided on the main beam 43. The cover plate 6 is fixed on the edge 436. The flexible wall 435 may be formed by the following method: firstly, the cavity 431 is formed in the main beam 43; and secondly, a cutter is placed in the cavity 431 to polish the wall connected to the first connecting part 41 to a predetermined thickness to form the flexible wall 435.

The connection between the first end portion 1 and the first connecting part 41 is rigid, whereas the connection between the first connecting part 41 and the main beam 43 via the flexible wall 435 is flexible. The connection between the second end portion 2 and the main beam 43 via the second connecting part 42 is flexible.

The second connecting part 42 comprises a horizontal extension 421, and the flexible connecting section on the second connecting part 42 is located on the horizontal extension 421 of the second connecting part 42.

A receiving groove 8 is provided in the fixed portion 1, and the force sensor further comprises a passage 9 for facilitating interaction between the receiving groove 8 and the cavity 431 with the passage 9 penetrating the first connecting part 41. The force sensor is further provided with a cable 7 electrically connected to an electronic element (not shown) locatable in the receiving groove 8. The electronic element in the receiving groove 8 is in communication with the strain gauges 5 for transferring the signals. In this implementation, the first end portion 1 is a fixed portion, and the second end portion 2 is a load-receiving portion. In another implementation, the first end portion 1 may be the load-receiving portion, and the second end portion 2 is the fixed portion.

In practice, the electronic element is located in the receiving groove 8. When the electronic element generates heat, a temperature gradient is formed across the cell. Since the strain gauges 5 are attached on the same sidewall of the cavity 431, the temperature difference between the strain gauges 5 is small, and thus the strain gauges 5 are less affected by the temperature gradient.

When the force sensor is mounted, both the fixed portion and the load-receiving portion need to be mounted with screws, resulting in varying magnitudes of stress in the fixed portion and the load-receiving portion. Mounting the strain gauges 5 on the main beam 43 can reduce the influence of the screws on the performance of the strain gauges 5.

FIG. 4 to 8 show a second embodiment of the present invention, which differs from the first embodiment in that a second connecting part 42 comprises a horizontal extension 421, and a vertical extension 422 connected to the horizontal extension 421; and a flexible connecting section (a stress sensitive region) on the second connecting part 42 is located on the vertical extension 422 of the second connecting part 42. In this implementation, the flexible connecting section is located at the upper and lower parts of the second connecting part 42.

A protrusion 437 is provided on the outer side of a left wall 435 (a flexible wall), two first grooves 4371 are provided in the position where the protrusion 437 intersects with a first connecting part 41, and by providing the first grooves 4371, the stress is better concentrated at the first grooves 4371. Strain gauges 5 are attached to the positions corresponding to the first grooves 4371, so that the force exerted on a cell can be better measured. The first grooves 4371 are recessed toward the first connecting part 41 and the flexible wall 435. By adjusting the size and position of the first grooves 4371, the stress sensitivity of the flexible wall at the first grooves 4371 can be adjusted. In order to obtain a better mechanical property, two second grooves 4372 are further arranged outside the first grooves 4371. By providing the first grooves 4371 at the protrusion 437, the thickness of the flexible wall 435 of the second embodiment tends to be greater than the corresponding thickness of the flexible wall 435 of the first embodiment.

In the first and second embodiments of the present invention, the processing methods for the flexible wall 435 are the same. In a preferred embodiment, the first end portion 1, the second end portion 2, the beam 4, and the parallel-guiding mechanisms 3 are formed integrally.

It will be apparent to a person skilled in the art that various modifications and variations can be made to the aforementioned exemplary embodiments of the present invention without departing from the scope or spirit of the present invention. The present invention is therefore intended to cover any modifications and variations of the present invention falling within the scope of the appended claims and equivalent technical solutions thereof.

REFERENCE SIGNS LIST 1 first end portion
2 second end portion
3 parallel-guiding mechanism
4 beam
5 strain gauges
6 cover plate
7 cable
8 receiving groove
9 hole
41 first connecting part
42 second connecting part
421 horizontal extension
422 vertical extension
43 main beam
431 cavity
432 rigid wall, right wall
433 lower wall
434 upper wall
435 flexible wall, left wall
436 edge
437 protrusion
4371 first grooves
4372 second grooves

The invention claimed is:

1. A force sensor, comprising:
   a first end portion;
   a second end portion;
   a parallel-guiding mechanism that connects the first end portion to the second end portion;
   a strain gauge; and
   a beam comprising:
      a main beam having a flexible wall, to which the strain gauge is attached, and a rigid wall;
      a first connecting part that connects the first end portion to the flexible wall of the main beam; and
      a second connecting part that connects the second end portion to the rigid wall of the main beam;
      wherein the main beam further has a cavity to accept arrangement of the strain gauge therein and a cover plate for sealing the cavity in a welded manner.

2. The force sensor of claim 1, further comprising:
   a protrusion on an outer side of the flexible wall that is connected to the first connecting part; and
   two grooves positioned where the protrusion intersects the first connecting part.

3. The force sensor of claim 1, wherein the flexible wall is formed by outwardly recessing the main beam.

4. The force sensor of claim 1, wherein the strain gauge is arranged above and/or below the position where the first connecting part intersects the flexible wall.

5. The force sensor of claim 1, wherein the first connecting part is a rigid beam, and the second connecting part is a flexible beam.

6. The force sensor of claim 5, wherein the second connecting part comprises a horizontal extension, and a flexible connecting section on the second connecting part is located thereon.

7. The force sensor of claim 5, wherein the second connecting part comprises a horizontal extension and a vertical extension, and a flexible connecting section on the second connecting part is located on the vertical extension.

8. The force sensor of claim 1, wherein:
   the first end portion operates as a fixed portion, and the second end portion operates as a load-receiving portion.

9. The force sensor of claim 1, wherein:
   the strain gauge is arranged in a region close to where the first connecting part intersects the flexible wall.

10. A force sensor, comprising:
    a first end portion;
    a second end portion;
    a parallel-guiding mechanism that connects the first end portion to the second end portion;
    a beam comprising:
       a main beam having a rigid wall and a flexible wall with a protrusion on an outer side of the flexible wall;
       a first connecting part that connects the first end portion to the protrusion;
       a second connecting part that connects the second end portion to the rigid wall; and
       two grooves positioned where the protrusion intersects the first connecting part; and
    a strain gauge that is fixed to the flexible wall.

11. A force sensor, comprising:
    a first end portion;
    a second end portion;
    a parallel-guiding mechanism that connects the first end portion to the second end portion;
    a beam comprising:
       a main beam having a flexible wall and a rigid wall;
       a rigid beam that connects the first end portion to the flexible wall of the main beam; and
    a flexible beam that connects the second end portion to the rigid wall of the main beam, the flexible beam comprising a horizontal extension and a vertical extension with a flexible connecting section on the vertical extension; and
    a strain gauge that is fixed to the flexible wall.

* * * * *